United States Patent
Schall

(10) Patent No.: US 11,488,035 B2
(45) Date of Patent: Nov. 1, 2022

(54) METHOD AND DEVICE FOR MACHINE LEARNING IN A COMPUTING UNIT

(71) Applicant: SIEMENS AKTIENGESELLSCHAFT, Munich (DE)

(72) Inventor: Daniel Schall, Hollabrunn (AT)

(73) Assignee: SIEMENS AKTIENGESELLSCHAFT, Munich (DE)

(*) Notice: Subject to any disclaimer, the term of this patent is extended or adjusted under 35 U.S.C. 154(b) by 358 days.

(21) Appl. No.: 16/761,851

(22) PCT Filed: Nov. 8, 2017

(86) PCT No.: PCT/EP2017/078534
§ 371 (c)(1),
(2) Date: May 6, 2020

(87) PCT Pub. No.: WO2019/091551
PCT Pub. Date: May 16, 2019

(65) Prior Publication Data
US 2021/0192368 A1     Jun. 24, 2021

(51) Int. Cl.
*G06N 5/04*     (2006.01)
*G06N 20/00*     (2019.01)

(52) U.S. Cl.
CPC ............ *G06N 5/04* (2013.01); *G06N 20/00* (2019.01)

(58) Field of Classification Search
CPC ........ G06N 5/04; G06N 20/00; G06N 3/0454; G05B 13/0265; H04L 41/16; H04L 41/0896; H04L 67/12
See application file for complete search history.

(56) References Cited

U.S. PATENT DOCUMENTS 10,356,119 B1 * 7/2019 Chang ................ H04L 63/1433
10,580,228 B2 * 3/2020 Korchev ................ H04L 69/04
(Continued)

FOREIGN PATENT DOCUMENTS

DE    102007017259    10/2008
DE    102016013985    6/2017

OTHER PUBLICATIONS

PCT International Search report dated Jul. 27, 2018 based on PCT/EP2017/078534 filed Nov. 8, 2017.
(Continued)

*Primary Examiner* — El Hadji M Sall
(74) *Attorney, Agent, or Firm* — Cozen O'Connor

(57) ABSTRACT

A method and device for machine learning wherein, in order to create favorable method conditions, an at least first machine learning model is trained via an at least first data set, a second machine learning model is trained via a second data set, an at least first prediction data set is formed via the trained at least first machine learning model, a second prediction data set is formed via the trained second machine learning model, a linking machine learning model is trained at least via the first prediction data set and the second prediction data set, a third prediction data set is formed via the linking machine learning model, and controlled variables for controlling a control apparatus are formed at least via the third prediction data set, such that the demand for computing power is reduced and the prediction accuracy and control accuracy are increased.

14 Claims, 3 Drawing Sheets

(56) References Cited

U.S. PATENT DOCUMENTS

| | | | | |
|---|---|---|---|---|
| 11,106,994 B1* | 8/2021 | Batalov | ................... | G06N 5/04 |
| 2018/0107943 A1* | 4/2018 | White | ................ | G06Q 10/1093 |
| 2018/0300576 A1* | 10/2018 | Dalyac | ................... | G06N 20/00 |
| 2018/0374105 A1* | 12/2018 | Azout | ..................... | G06N 3/08 |
| 2019/0122139 A1* | 4/2019 | Perez | ..................... | G06N 20/20 |
| 2021/0192368 A1* | 6/2021 | Schall | ................... | G06N 20/00 |

OTHER PUBLICATIONS

Yuksel S E et al: "Twenty Years of Mixture of Experts", IEEE Transactions On Neural Networks and Learning Systems, IEEE, Piscataway, NJ, USA, vol. 23, No. 8, pp. 1177-1193, XP011482274, ISSN: 2162-237X, DOI: 10.1109/TNNLS.2012.2200299, pp. 1177-1188; 2012.

* cited by examiner

METHOD AND DEVICE FOR MACHINE LEARNING IN A COMPUTING UNIT

CROSS-REFERENCE TO RELATED APPLICATIONS

This is a U.S. national stage of application No. PCT/EP2017/078534 filed 8 Nov. 2017, the content of which is incorporated herein in its entirety.

BACKGROUND OF THE INVENTION

1. Field of the Invention

The invention relates to a method and a device for machine learning in a computing unit, for a control device, in particular, a machine, where ensemble methods and classification models are utilized.

2. Description of the Related Art

An implementation of data analysis methods and methods of machine learning in computing units of industrial monitoring and control devices (e.g., systems such as the known Siemens SCADA) enables a use of statistical models for the classification of error or servicing scenarios. Appropriate classification models known from the prior art on the basis of methods of machine learning, for example, Random Forest, Support Vector Machine or artificial neural networks are often trained offline, i.e., with inactive data transmission via a communication interface and subsequently instantiated for prognosis calculations online, i.e., with active data transmission via the communication interface, for example, in or from a network. An online updating of classification models is typically not possible, so that an updating of the classification models is often associated with a complete training run. This has the disadvantage of a large requirement for computer power, storage capacity and network bandwidth, whereby high costs can be incurred.

DE 10 2016 013 985 A1 discloses a device for machine learning within a machine. Here, a learning unit and a status observation unit are provided, where the status observation unit observes state variables relating to a position, a rotary speed and an electric current in a motor control device. Training data sets are formed from the state variables. With the training data sets, the device or its learning unit learns a condition in relation to the number of target value corrections regarding the position, the rotary speed and the electric current.

SUMMARY OF THE INVENTION

It is an object of the invention to provide a method for machine learning in a computing unit, for a control device in particular a machine, where ensemble methods and classification models are utilized, which is further developed in comparison to conventional machine learning methods.

This and other objects and advantages are achieved in accordance with the invention by a method in which via an at least first data set that comprises data acquired by at least one sensor for an at least first time region, an at least first machine learning model is trained, where via a second data set that comprises data acquired by the at least one sensor for a second time region that is separated from the at least first time region, a second machine learning model is trained, where via the trained, at least first machine learning model, data for an at least first prognosis time region is prognosticated and therefrom an at least first prognosis data set is formed, where via the trained second machine learning model, data for a second prognosis time region which overlaps the at least first prognosis time region, is prognosticated and therefrom a second prognosis data set is formed, where at least via the first prognosis data set and the second prognosis data set, a linkage machine learning model is trained, whereby via the linkage machine learning model, data for the second prognosis time region is prognosticated (i.e., forecast or predicted) and therefrom a third prognosis data set is formed, and where at least via the third prognosis data set, control variables are formed and with these control variables, the control device is controlled.

The second machine learning model is formed based on a machine evaluation of the first machine learning model with respect to its accuracy and reliability. This is required, for example, if the data acquired by the sensor, where the data can be, for example, machine parameters such as rotary speeds, substantially changes.

Through an incremental formation of the second machine learning model for the second time region with respect to the first machine learning model and its first time region (the first time region and the second time region do not overlap, rather, for example, the second time region adjoins the first time region), training the second machine learning model based on data from the first time region can be dispensed with. Even if in the second machine learning model, results of the evaluation of the first machine learning model can be used, then this machine learning model is formed primarily on the basis of data acquired via the sensor relating to the second time region that is separate from the first time region, whereby for the second machine learning model, a corresponding observation period is reduced.

With a reduction of the observation time period, demands relating to computer power, storage capacity, network bandwidth and therefore costs are reduced. Likewise, based on the linkage machine learning model, in which both data of the first machine learning model and also of the second machine learning model are taken into account, levels of prognosis accuracy and control accuracy and also of prognosis reliability and control reliability are increased. For example, prognostication of machine states (e.g., an uncritical state in which a rotary speed or a temperature undershoots a defined threshold value or a critical state in which the rotary speed or the temperature exceeds the threshold value) can be undertaken with a high level of accuracy and therefrom the first prognosis data set, the second prognosis data set and the third prognosis data set can be formed.

Furthermore, with the first machine learning model and the second machine learning model, prognosis calculations based on non-constant progressions of acquired parameters can also be carried out. For example, a thickness of a wearing component acquired by the sensor can decrease linearly and on exchange of the component, re-resume its original dimension. A corresponding thickness variation would thus be sawtooth-shaped. If the exchange occurs outside the first time region of the first machine learning model and within the second time region of the second machine learning model, then it is taken into account in the second machine learning model, i.e., the second machine learning model is trained to that effect. The first machine learning model is combined with the second machine learning model into a linkage machine learning model. Therefore, with the linkage machine learning model, prognosis calculations can be performed for continuous and discontinuous thickness variations taking into account component exchange time points.

In an advantageous embodiment, at least the second machine learning model and the linkage machine learning model are formed during a program execution time. With this measure, an improvement of the computer power is achieved. A program package in which the first machine learning model, the second learning model and the linkage machine learning model are implemented, can form, for example, during the program execution time, i.e., at the program execution time, firstly, the second machine learning model and the linkage machine learning model and, secondly, perform prognosis calculations, form control variables, control the control device and transfer data into a network and receive data from this network, and the like.

A favorable solution is achieved if the at least first data set and the second data set are formed from parameters that are transferred via the at least first machine learning model, the second machine learning model and the linkage machine learning model into state data.

In this regard, it can also be advantageous if the state data is changed after its formation. It is also favorable if adjustable plausibility coefficients are associated with the state data.

The state data can be, for example, machine states. For example, a first state can describe an uncritical state of the machine and a second state can describe a critical state. A change to this state data can occurs, for example, in relation to an evaluation of results of the prognosis calculations if, for example, it becomes apparent that states have been falsely classified.

With the association of plausibility coefficients with the state data, results of the prognosis calculations, i.e., for example, their reliability, are evaluated and/or weighted.

It is favorable if at least the first machine learning model and the second machine learning model are formed with different methods of machine learning. A favorable flexibility is thereby achieved. For the first machine learning model, for example, a Random Forest method can be used and for the second machine learning model, a Support Vector Machine method can be used. With this, an advantageous adaptation of the first machine learning model and of the second machine learning model to the fields of use suitable to the respective method is achieved.

A favorable solution is achieved if at least the first machine learning model is transferred via at least one network. With this measure, an access to geographically remote computing units or computer clouds, in which machine learning models are implemented is enabled or the first machine learning model can be made accessible via these remote computing units or computer clouds.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will now be described in greater detail making reference to exemplary embodiments, in which.

DETAILED DESCRIPTION OF THE EXEMPLARY EMBODIMENTS

Figure 1:
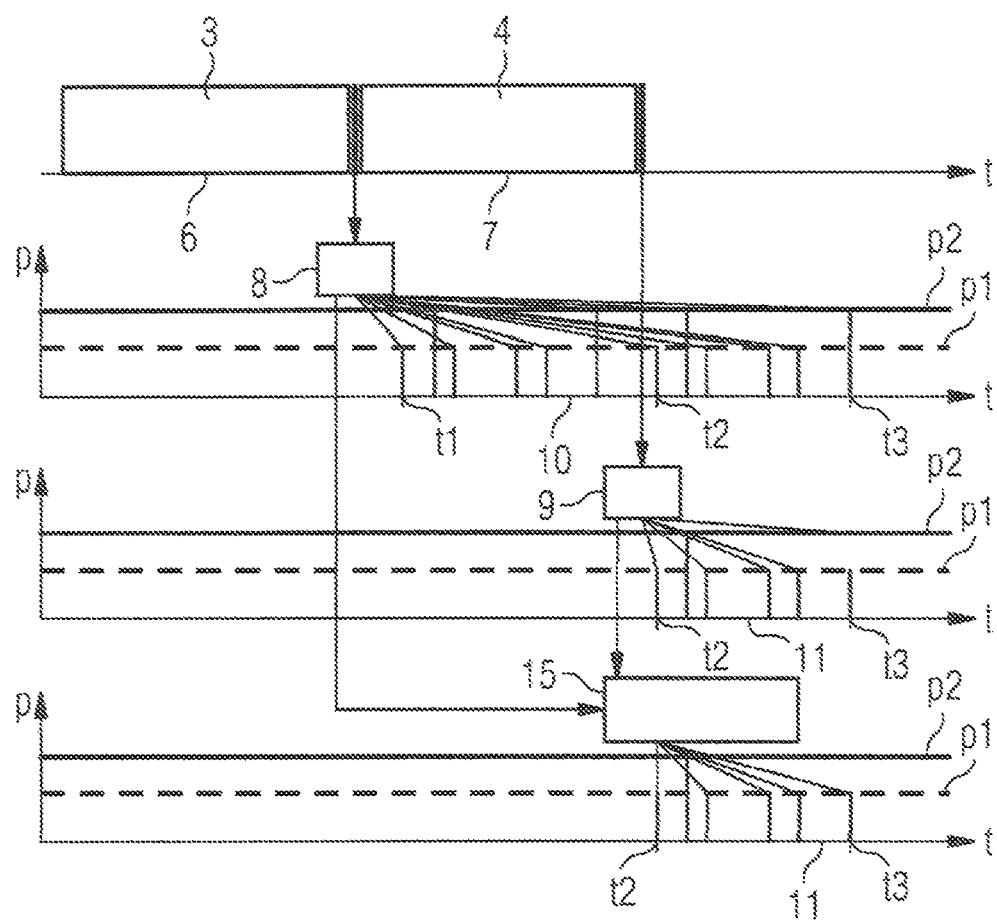
FIG. 1 is a first flow diagram of an exemplary embodiment of a method in accordance with the invention for controlling a machine with a first machine learning model, a second machine learning model and a linkage machine learning model.

FIG. 1 shows a first flow diagram of an exemplary embodiment of a method in accordance with the invention. The method is implemented in a computing unit 1 of a control device 2 which is shown schematically in FIG. 2. The computing unit 1 is implemented in a machine (not shown) which is provided as a drive unit of an electric vehicle.

Figure 2:
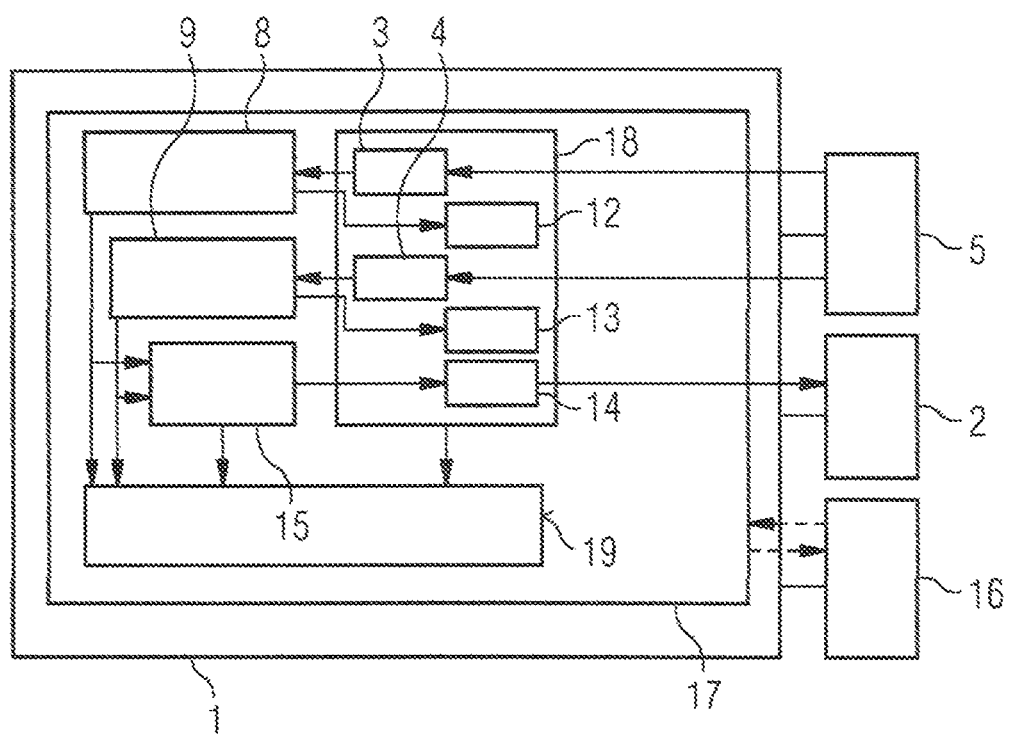
FIG. 2 is a schematic representation of an exemplary embodiment of a device in accordance with the invention, where a computing unit with a program packet is shown, which is linked to a control device.

With a first data set 3 that has data acquired from a sensor 5 shown schematically in FIG. 2 for a first time region 6, a first machine learning model 8 is trained.

A second machine learning model 9 is trained via a second data set 4 that comprises data acquired by the sensor 5 for a second time region 7 that adjoins the first time region 6 without overlap, i.e., is separate therefrom. The first data set 3 and the second data set 4 comprise machine parameters that characterize rotary speeds of the machine.

With the trained first machine learning model 8, data for a first prognosis time region 10 is prognosticated (i.e., forecast or predicted) and therefrom an at least first prognosis data set 12 is formed.

With the trained second machine learning model 9, data for a second prognosis time region 11 that overlaps the first prognosis time region 10 is prognosticated and therefrom a second prognosis data set 13 is formed.

With the first prognosis data set 12 and the second prognosis data set 13 a linkage machine learning model 15 is trained that is formed as a metamodel via a linkage of the first machine learning model 8 and the second machine learning model 9.

With the linkage machine learning model 15, data for the second prognosis time region 11 is prognosticated and therefrom a third prognosis data set 14 is formed.

The first prognosis data set 12, the second prognosis data set 13 and the third prognosis data set 14 comprise state data that describes a first state p1 or a second state p2 of the machine.

The first state p1 characterizes rotary speeds below a defined threshold value, the second state p2 defines rotary speeds above this threshold value.

This state data is determined from the machine parameters via the first machine learning model 8 for the first prognosis time region 10 and via the second machine learning model 9 and the linkage machine learning model 15 for the second prognosis time region 11 and is evaluated.

According to the plausibility of the state data that depends thereon for which value range in relation to the machine parameters the first machine learning model 8 and the second machine learning model 9 are configured, the state data is assigned to plausibility characteristics. These comprise plausibility coefficients. The greater the plausibility of the first state p1 or of the second state p2 for a time t, the larger is the plausibility coefficient.

With the third prognosis data set 14, control variables (not shown) are formed and with these control variables, the control device 2 is controlled such that via a proportional-integral-derivative (PID) controller, target motor rotary speeds are determined and their achievement or maintenance is monitored.

FIG. 1 shows a time scale relating to the time t and three graphs on the abscissas of which, the times t and on the ordinates of which machine states p are entered. A first time point t1 has the first state p1 prognosticated (i.e., forecast or predicted) via the first machine learning model 8 and a second time point t2 also has the first state p1 prognosticated by the first machine learning model 8 and also by the second machine learning model 9.

For a third time point t3, the second state p2 is prognosticated by the first machine learning model 8 and the first state p1 is prognosticated by the second machine learning model 9.

For the third time point t3, a higher plausibility coefficient is associated with a prognosis which is formed via the second machine learning model 9, than with a prognosis that is formed by the first machine learning model 8.

With the linkage machine learning model 15, for the second time point t2, the first state p1 is prognosticated and for the third time point t3, based on the aforementioned higher plausibility coefficient, the first state p1 is prognosticated. In the three graphs, further time points are shown, for which also first states p1 and second states p2 of the first machine learning model 8 and the second machine learning model 9 and the linkage machine learning model 15 are prognosticated.

In order to form the first machine learning model 8, a Random Forest is used as a classification method known from the prior art. In order to form the second machine learning model 9, a Support Vector Machine is used as a known method for pattern recognition. This is a favorable solution. In accordance with the invention, however, it is also conceivable to provide a Random Forest method for the second machine learning model 9.

The linkage machine learning model 15 is formed as a combination of the first machine learning model 8 and the second machine learning model 9. The second machine learning model 9 and the linkage machine learning model 15 are formed at the execution time of a program package 17 shown in FIG. 2.

In rotary speed regions and/or time frames in which more plausible prognoses are formed via the first machine learning model 8, Random Forest algorithms of the first machine learning model 8 are used for the linkage machine learning model 15.

In rotary speed regions and/or time frames in which more plausible prognoses are formed via the second machine learning model 9, Support Vector Machine algorithms of the second machine learning model 9 are used for the linkage machine learning model 15.

The method in accordance with the invention is executed as an ensemble method. Accordingly, different learning algorithms are provided for use.

For the presently contemplated embodiment, the first machine learning model 8 and the second machine learning model 9 are used for forming the linkage machine learning model 15.

However, in accordance with the invention, it is also conceivable that a third machine learning model and further machine learning models are combined to the linkage machine learning model 15.

It is also conceivable that more than one linkage machine learning model 15 is formed, for example, a first linkage machine learning model 15 from the first machine learning model 8 and the second machine learning model 9 and also a second linkage machine learning model from a third machine learning model and a fourth machine learning model, etc.

FIG. 2 shows an exemplary embodiment of a device in accordance with the invention with a computing unit 1 of a machine (not shown) in which a program package 17 is provided and that is supplied with electricity via a voltage supply apparatus (not shown).

Within the program package 17, a first machine learning model 8, a second machine learning model 9 and a linkage machine learning model 15, which are described in relation to FIG. 1, are implemented.

Furthermore, the program package 17 has a database 18 in which a first data set 3 and a second data set 4, as well as a first prognosis data set 12, a second prognosis data set 13 and a third prognosis data set 14 that were mentioned in relation to FIG. 1, are stored.

A sensor 5, which acquires rotary speeds of the machine and transfers corresponding data via a conductor route to the computing unit 1, is linked to the computing unit 1. The first data set 3 and the second data set 4 are formed from this data.

With the first machine learning model 8, the second machine learning model 9 and the linkage machine learning model 15, as described in relation to FIG. 1, based on the basis of the rotary speed information acquired from the sensor 5 or the data transferred to the computing unit 1, states of the machine are prognosticated (for example, damage states based on rotary speeds that exceed a defined threshold value over a relatively long timeframe), i.e., prognosis calculations, are performed. For a corresponding evaluation, from data of the first prognosis data set 12 describing these states, the second prognosis data set 13 and the third prognosis data set 14 are formed.

The computing unit 1 is further connected to a control device 2 to which data from the third prognosis data set 14 is transferred. The control device 2 has a proportional-integral-derivative (PID) controller (not shown) for rotary speed regulation of the machine, in which the data from the third prognosis data set 14 is converted into control variables. These control variables are executed as target rotary speeds that must be maintained by the machine and/or must not be exceeded, in order not to allow prognosticated damage to the machine to occur.

In accordance with the invention, it is conceivable that, for example, for control purposes, data from the first prognosis data set 12 and/or the second prognosis data set 13 is transferred to the control device 2 and processed there.

Furthermore, the computing unit 1 is connected via a network 16 to a computer cloud (not shown). From this computer cloud, data from machine learning models that are formed outside the computing unit 1 and are performed via their prognosis calculations, can be received and processed in the computer unit 1, i.e., can be transferred to the control device 2, for example, for forming control variables. Furthermore, prognosis data sets (e.g., the third prognosis data set 14) are transferred from the database 18 of the computing unit 1 via the network 16 to this computer cloud to be processed therein.

The program package 17 comprises a graphical user interface 19, via which a user can make input and receives output. For this purpose, the computing unit 1 is connected to input devices (keyboard and mouse) and an output device (display device) (all not shown).

Methods or algorithms to be provided for the prognosis calculations are selected via the user interface 19. For example, as described in relation to FIG. 1, a Random Forest algorithm can be selected for the first machine learning model 8 and a Support Vector Machine algorithm can be selected for the second machine learning model 9. For each selectable method, quality information is displayed, for example, for which rotary speed regions particularly exact results are to be expected with this method.

Furthermore, via the user interface 19 in conjunction with state data (mentioned in relation to FIG. 1) and plausibility coefficients can be amended and/or set. For example, a change of state data or plausibility coefficients is required if results of the prognosis calculations prove to be faulty. For example, in such a case, plausibility coefficients can be set to a low value or, for example, a first state p1 (mentioned in relation to FIG. 1) can be corrected to a second state p2 (also mentioned in relation to FIG. 1).

Furthermore, via the user interface 19, data for training and/or learning processes of the first machine learning model 8, the second machine learning model 9 and the linkage machine learning model 15 can be selected and aggregated, the learning processes can be monitored and results of these learning processes can be evaluated.

The first machine learning model 8, the second machine learning model 9 and the linkage machine learning model 15 are trained and evaluated in the computing unit 1 (i.e., locally) and/or plausibility coefficients are assigned locally.

The computing unit 1 is connected to the network 16. It is therefore also conceivable that the first machine learning model 8, the second machine learning model 9 and/or the linkage machine learning model 15 are trained locally and subsequently transferred into the computer cloud. It is further conceivable that the first machine learning model 8, the second machine learning model 9 and/or the linkage machine learning model 15 are trained and evaluated in the computer cloud and that corresponding data is transferred from the computer cloud via the network 16 to the computing unit 1 and inserted into the prognosis calculation to be performed in the computing unit 1.

It is further possible that the first machine learning model 8, the second machine learning model 9 and/or the linkage machine learning model 15 are trained in the computer cloud and evaluated in the computing unit 1.

For this contemplated embodiment, the control device 2 is implemented as a rotary speed regulator. In accordance with the contemplated embodiments of the invention, the control device 2 is configured, for example, as a diagnosis and monitoring device. For example, temperatures of a wheelset bearing can be monitored with the diagnosis and monitoring device and on a prognosticated exceeding of a threshold value, warning events can be displayed on the graphical user interface 19.

It is further possible that, for processing results of the prognosis calculations, more than one control device 2 is connected to the computing unit 1.

Figure 3:
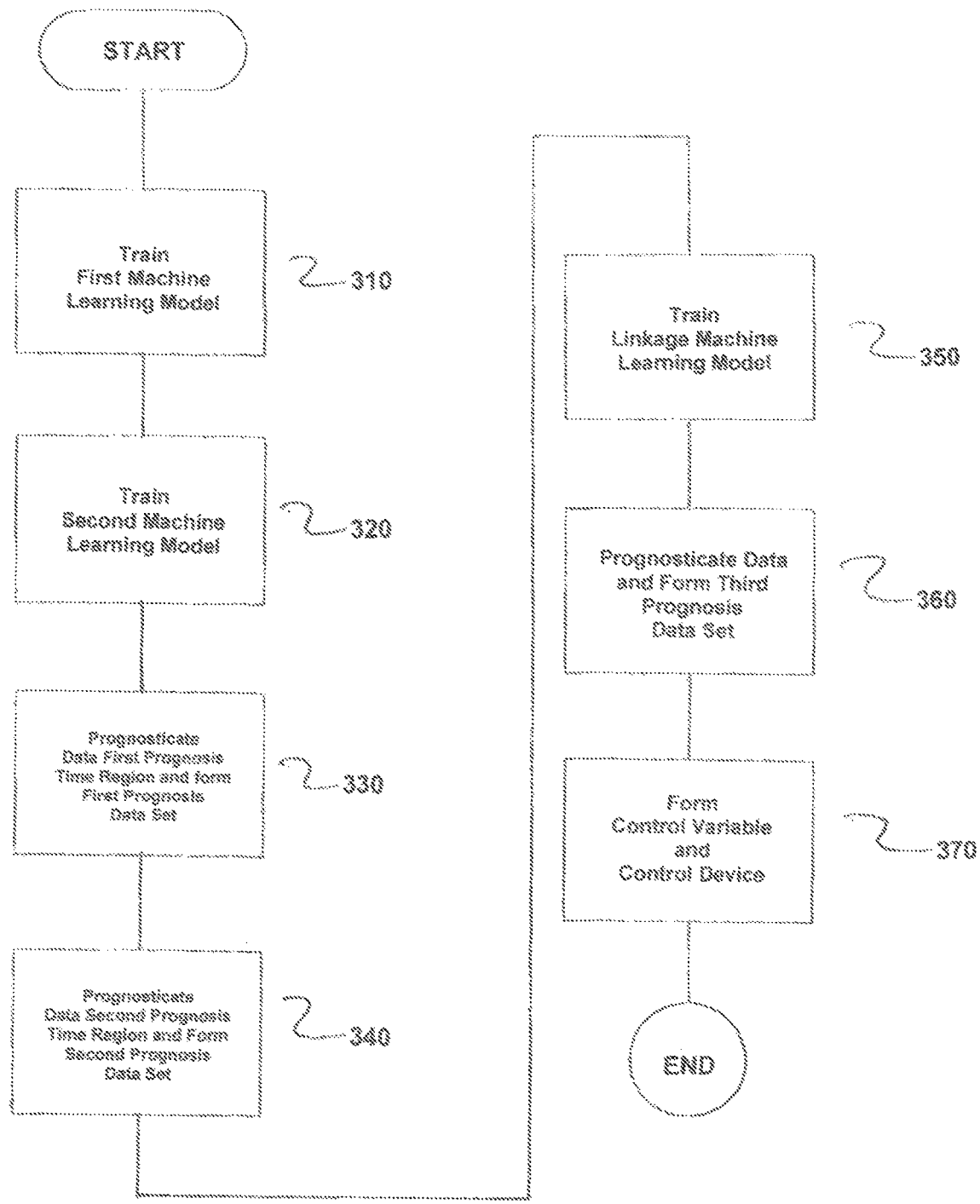
FIG. 3 is a flowchart of the method in accordance with the invention.

FIG. 3 is a flowchart of a method for machine learning in a computing unit for a control device, ensemble methods and classification models being utilized.

The method comprises training an at least first machine learning model 8 via an at least first data set 3 that comprises data acquired by at least one sensor 5 for an at least first time region 6, as indicated in step 310.

Next, a second machine learning model 9 is trained via a second data set 4 that comprises data acquired by the at least one sensor 5 for a second time region 7 which is separate from the at least first time region 6, as indicated in step 320.

In accordance with the invention, the second machine learning model 9 is formed incrementally based on a machine evaluation of the at least first machine learning model 8 with respect to an accuracy and reliability of said at least first machine learning model 8, where results of the evaluation of the first machine learning model 8 are utilized in the second machine learning model 9.

Next, data for an at least first prognosis time region 10 is procrastinated (i.e., forecast or predicted) via the trained at least first machine learning model 8 and an at least first prognosis data set 12 is formed from the prognosticated data for the at least first prognosis time region 10, as indicated in step 330.

Next, data for a second prognosis time region 11 which overlaps with the at least first prognosis time region 10 is prognosticated via the trained second machine learning model 9 and a second prognosis data set 13 is formed from the prognosticated data for a second prognosis time region 11, as indicated in step 340.

Next, a linkage machine learning model 15 is trained at least via the first prognosis data set 12 and the second prognosis data set 13, as indicated in step 350.

Next, data for the second prognosis time region 11 is prognosticated via the trained linkage machine learning model 15 and a third prognosis data set 14 is formed from the prognosticated data for the second prognosis time region 11, as indicated in step 360.

Next, control variable are formed at least via the third prognosis data set 14 and controlling the control device is controlled with the formed control variables, as indicated in step 370.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for machine learning in a computing unit for a control device, ensemble methods and classification models being utilized, the method comprising:

training an at least first machine learning model via an at least first data set which comprises data acquired by at least one sensor for an at least first time region;

training a second machine learning model via a second data set which comprises data acquired by the at least one sensor for a second time region which is separate from the at least first time region, the second machine learning model being formed incrementally based on a machine evaluation of the at least first machine learning model with respect to an accuracy and reliability of said at least first machine learning model, and results of the evaluation of the first machine learning model being utilized in the second machine learning model;

prognosticating data for an at least first prognosis time region via the trained at least first machine learning model and forming an at least first prognosis data set from said prognosticated data for the at least first prognosis time region;

prognosticating data for a second prognosis time region which overlaps with the at least first prognosis time region via the trained second machine learning model and forming a second prognosis data set from said prognosticated data for a second prognosis time region;

training a linkage machine learning model at least via the first prognosis data set and the second prognosis data set;

prognosticating data for the second prognosis time region via the trained linkage machine learning model and forming a third prognosis data set from said prognosticated data for the second prognosis time region; and forming control variable at least via the third prognosis data set and controlling the control device with said formed control variables.

2. The method as claimed in claim 1, wherein at least the second machine learning model and the linkage machine learning model are formed during a program execution time.

3. The method as claimed in claim 1, wherein the at least first data set and the second data set are formed from parameters which are transferred via the at least first machine learning model, the second machine learning model and the linkage machine learning model into state data which describes a state of a machine.

4. The method as claimed in claim 2, wherein the at least first data set and the second data set are formed from parameters which are transferred via the at least first machine learning model, the second machine learning model and the linkage machine learning model into state data which describes a state of a machine.

5. The method as claimed in claim 3, wherein the state data is changed after being formation via a user interface.

6. The method as claimed in claim 3, wherein adjustable plausibility coefficients are associated with the state data.

7. The method as claimed in claim 5, wherein adjustable plausibility coefficients are associated with the state data.

8. The method as claimed in claim 3, wherein the at least first prognosis data set, the second prognosis data set and the third prognosis data set are formed from the state data.

9. The method as claimed in claim 3, wherein the at least first prognosis data set, the second prognosis data set and the third prognosis data set are formed from the state data.

10. The method as claimed in claim 6, wherein the at least first prognosis data set, the second prognosis data set and the third prognosis data set are formed from the state data.

11. The method as claimed in claim 1, wherein at least the first machine learning model and the second machine learning model are formed via different methods of machine learning.

12. The method as claimed in claim 1, wherein at east the first machine learning model is transferred via at least one network.

13. A device which is configured to perform the method as claimed in claim 1, wherein the computing unit includes a program package in which the at least first machine learning model, the second machine learning model and the linkage machine learning model are implemented and includes at least one database, and wherein the computing unit is connected to (i) at least one network, (i) the sensor and (iii) the control device.

14. The device as claimed in claim 13, wherein the computing unit comprises at least one input device and at least one output device and the program package has a graphical user interface.

* * * * *